US010029195B2

(12) United States Patent
Strain et al.

(10) Patent No.: US 10,029,195 B2
(45) Date of Patent: Jul. 24, 2018

(54) COMPARTMENTALLY EXPANDABLE ROTATING BELT FILTER FOR ENERGY USE REDUCTION

(71) Applicant: NEXOM (U.S.), INC., Grafton, WI (US)

(72) Inventors: Cornelius Strain, Post Falls, ID (US); Bradley Messerschmidt, Spokane, WA (US); Mark S. Lopp, Coeur d'Alene, ID (US); Eric Skidmore, Harrison, ID (US); Kylan Kracher, Spokane, WA (US)

(73) Assignee: NEXOM (US), INC., Grafton, WI (US)

( * ) Notice: Subject to any disclaimer, the term of this patent is extended or adjusted under 35 U.S.C. 154(b) by 0 days.

(21) Appl. No.: 14/412,625

(22) PCT Filed: Jul. 8, 2013

(86) PCT No.: PCT/US2013/049604
§ 371 (c)(1),
(2) Date: Jan. 2, 2015

(87) PCT Pub. No.: WO2014/008511
PCT Pub. Date: Jan. 9, 2014

(65) Prior Publication Data
US 2015/0157965 A1    Jun. 11, 2015

Related U.S. Application Data

(60) Provisional application No. 61/668,981, filed on Jul. 6, 2012.

(51) Int. Cl.
*B01D 33/056* (2006.01)
*B01D 33/64* (2006.01)
(Continued)

(52) U.S. Cl.
CPC .......... *B01D 33/056* (2013.01); *B01D 33/04* (2013.01); *B01D 33/64* (2013.01); *B01D 33/804* (2013.01); *B01D 33/806* (2013.01)

(58) Field of Classification Search
CPC ...... B01D 33/04; B01D 33/056; B01D 33/80; B01D 33/58; B01D 25/12; B01D 24/46; B01D 33/64
(Continued)

(56) References Cited

U.S. PATENT DOCUMENTS 3,531,404 A * 9/1970 Goodman et al. ............ 210/732
3,836,681 A * 9/1974 Dodd ............................ 426/272
(Continued)

FOREIGN PATENT DOCUMENTS

DE      7716727 U1    10/1979
DE      19802179 A1   10/1999
(Continued)

OTHER PUBLICATIONS

Chinese Patent Application No. 2013-80046521, Office Action and Search Report dated Jul. 6, 2012, with English Translation.
(Continued)

*Primary Examiner* — Heidi Kelley
*Assistant Examiner* — Akash Varma

(57) ABSTRACT

The present technology relates generally to fluid filtration systems. In particular, several embodiments are directed toward compartmentally expandable rotating belt filters and associated systems and methods. In some embodiments, for example, a filtering system for contaminated fluid includes a first fluid filtering chamber having a first filter belt movably positioned therein and a second fluid filtering chamber having a second filter belt movably positioned therein. The first filter belt can be operable in parallel with the second filter belt. The system can further include a sensor config-
(Continued)

ured to sense a condition related a volume of the contaminated fluid, a speed of flow of the contaminated fluid, or a level of contaminants in the contaminated fluid. A controller can be configured to initiate, stop, or adjust fluid flow to the first fluid filtering chamber and second fluid filtering chamber individually in response to the sensed condition.

20 Claims, 6 Drawing Sheets

(51) Int. Cl.
*B01D 33/60* (2006.01)
*B01D 33/04* (2006.01)
*B01D 33/80* (2006.01)

(58) Field of Classification Search
USPC ....... 210/770, 771, 783, 785, 798, 806, 808, 210/258, 297, 298, 319, 356, 400, 406, 210/407, 408, 416.1, 739
See application file for complete search history.

(56) References Cited

U.S. PATENT DOCUMENTS

| | | | |
|---|---|---|---|
| 3,864,255 A * | 2/1975 | Swanson | 210/770 |
| 4,830,750 A | 5/1989 | Jandourek et al. | |
| 5,456,832 A * | 10/1995 | Louden et al. | 210/386 |
| 5,462,677 A | 10/1995 | Benesi | |
| 5,961,847 A | 10/1999 | Creps et al. | |
| 6,511,597 B2 | 1/2003 | Hori et al. | |
| 6,571,959 B1 | 6/2003 | Moore et al. | |
| 2004/0005975 A1* | 1/2004 | Garthaffner | A24D 3/0229 493/39 |
| 2009/0200248 A1* | 8/2009 | Van Rooyen | 210/783 |
| 2009/0314721 A1 | 12/2009 | Wood et al. | |
| 2011/0089122 A1 | 4/2011 | Smith | |
| 2014/0083295 A1 | 3/2014 | Jackson | |

FOREIGN PATENT DOCUMENTS

| | | |
|---|---|---|
| JP | 2008006430 A | 1/2008 |
| WO | 9117319 A1 | 11/1991 |
| WO | 0139863 A1 | 6/2001 |

OTHER PUBLICATIONS

European Patent Application No. 13813355, Supplementary European Search Report dated Apr. 18, 2016.
European Patent Application No. 15796617.7, Supplementary European Search Report dated Jan. 17, 2018.
International Patent Application No. PCT/US2013/049604, International Preliminary Report on Patentability dated Jan. 15, 2015.
International Patent Application No. PCT/US2013/049604, International Search Report and Written Opinion dated Oct. 18, 2013.
International Patent Application No. PCT/US2015/031854, International Preliminary Report on Patentability dated Dec. 1, 2016.
International Patent Application No. PCT/US2015/031854, International Search Report dated Aug. 25, 2015.

* cited by examiner

COMPARTMENTALLY EXPANDABLE ROTATING BELT FILTER FOR ENERGY USE REDUCTION

CROSS-REFERENCE TO RELATED APPLICATIONS

The present application claims the benefit of U.S. Provisional Patent Application No. 61/668,981, filed Jul. 6, 2012. The foregoing application is incorporated herein by reference in its entirety. Further, components and features of embodiments disclosed in the application incorporated by reference may be combined with various components and features disclosed and claimed in the present application.

TECHNICAL FIELD

The present technology relates generally to fluid filtration systems. In particular, several embodiments are directed toward compartmentally expandable rotating belt filters and associated systems and methods.

BACKGROUND

Purified water is used in many applications, including the chemical, power, medical and pharmaceutical industries, as well as for human consumption. Typically, prior to use, water is treated to reduce the level of contaminants to acceptable limits. Treatment techniques include physical processes such as filtration, sedimentation, and distillation; biological processes such as slow sand filters or activated sludge; chemical processes such as flocculation and chlorination; and the use of electromagnetic radiation such as ultraviolet light.

Physical filtration systems are used to separate solids from fluids by interposing a medium (e.g., a mesh or screen) through which only the fluid can pass. Undesirable particles larger than the openings in the mesh or screen are retained while the fluid is purified. In water treatment applications, for example, contaminants from wastewater such as storm water runoff, sediment, heavy metals, organic compounds, animal waste, and oil and grease must be sufficiently removed prior to reuse. Water purification plants and water purification systems often make use of numerous water filtration units for purification. It would be desirable to provide improved filtering units to reduce the expense and complexity of such purification systems.

DETAILED DESCRIPTION

Figure 1A:
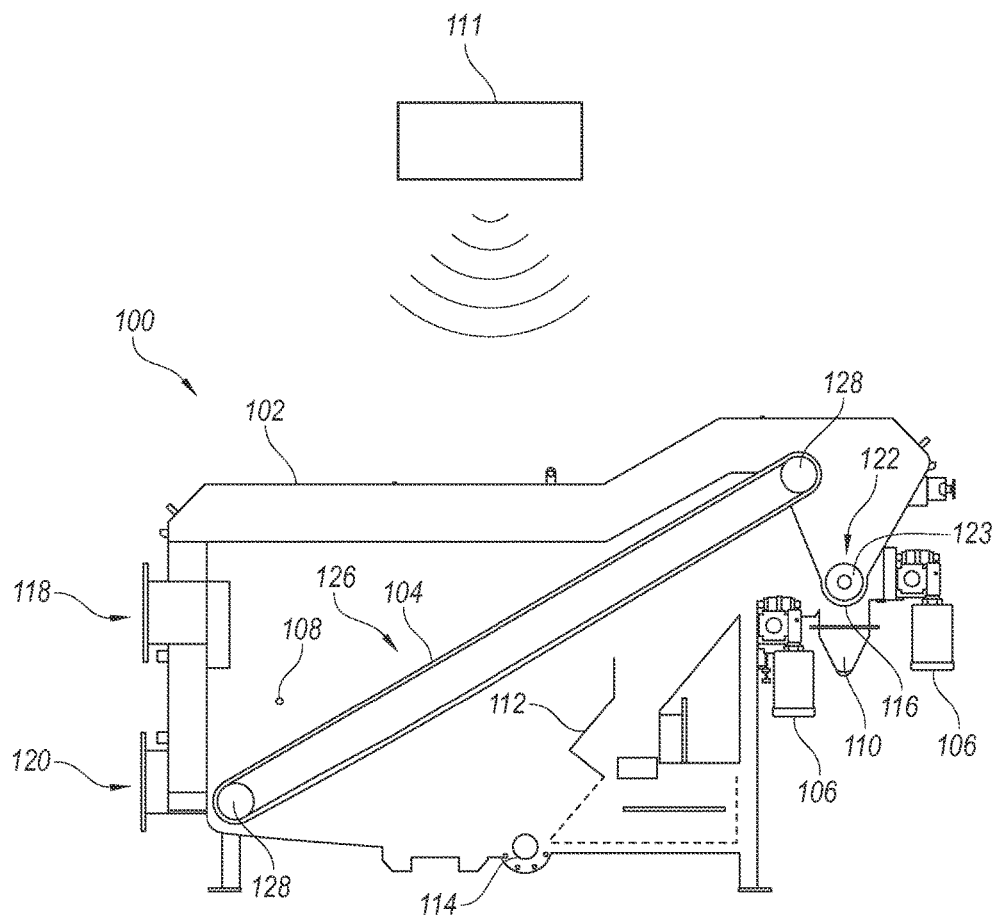
FIG. 1A is a front sectional view of a compartmentally expandable water filtration system configured in accordance with embodiments of the technology.

The present technology relates generally to fluid filtration systems. In particular, several embodiments are directed toward compartmentally expandable rotating belt filters and associated systems and methods. In some embodiments, for example, a filtering system includes a first fluid filtering chamber having a first inlet in communication with a first fluid pathway and a first filter belt positioned around a first set of rollers in the first fluid pathway. The system further includes a second fluid filtering chamber having a second inlet in communication with a second fluid pathway. The second fluid filtering chamber can have a shared sidewall with the first fluid filtering chamber. A second filter belt is positioned around a second set of rollers in the second fluid pathway. The first filter belt can be movable independent of the second filter belt.

In some embodiments, the first filter belt and the second filter belt are positioned at a generally perpendicular or diagonal incline from horizontal. The filtering system can further include an influent well in fluid communication with the first fluid filtering chamber and the second fluid filtering chamber, where the influent well can include at least one adjustable weir to adjust fluid flow to the first and second fluid filtering chambers. In further embodiments, the system can include a controller configured to control at least one of flow of fluid in the first and second fluid pathways or speed of operation of the first filter belt and the second filter belt. In some embodiments the system can include one or more sensors configured to sense at least one condition related to a volume of flow or a level of contaminants in a fluid, and the controller can be responsive to the sensed condition. The sensor can be positioned in an influent well in fluid communication with the first fluid filtering chamber and the second fluid filtering chamber. Alternatively, one or more sensors can be positioned in an effluent well.

In still further embodiments, the system can include a solids handling system in fluid communication with the first fluid filtering chamber and the second fluid filtering chamber. The solids handling system can receive solids filtered by at least one of the first filter belt and second filter belt. In some embodiments, the solids handling system can include a dewatering auger having a perforated or slotted filter plate configured to drain fluid from the solids. The solids handling system can further include a spring-tensioned back-pressure cone configured to provide generally constant dewatering back-pressure to the solids collection system. In particular embodiments, the first and second set of rollers are rotated by at least one drive shaft, and the filtering system further includes a motor and gear system mounted perpendicular to the drive shaft.

In another embodiment of the technology, a method of filtering fluid can include inletting contaminated fluid into a filtering system and sensing at least one of a volume of the contaminated fluid or a level of contaminants in the contaminated fluid. The method can further include, in response to the sensing, inletting the contaminated fluid into at least one of a plurality of fluid filtering channels operating in parallel, or into a common influent well shared by the fluid filtering channels. Individual fluid filtering channels can be separated by a shared partition wall, where each individual fluid filtering channel can include a filter belt therein. In some embodiments, the method further includes isolating fluid flow to an individual fluid filtering channel in response to the sensing. In further embodiments, the method includes equalizing a volume of fluid flow of the contaminated fluid to a plurality of the individual fluid filtering channels through the use of adjustable weirs positioned in a common influent well. The method can include filtering solids from the contaminated fluid, where the solids are passed to a solids collection system in fluid communication with the plurality of fluid filtering channels. The solids can be passed to a dewatering auger having a perforated or slotted filter plate. Fluid can be drained from the solids via the filter plate.

In further embodiments of the technology, a filtering system for filtering contaminated fluid includes a first fluid filtering chamber having a first filter belt movably positioned therein and a second fluid filtering chamber having a second filter belt movably positioned therein. In particular embodiments, the first and second chambers are separated by a shared partition. The first filter belt can be operable in parallel with the second filter belt. The system can further include one or more sensors configured to sense a condition related to a volume of the contaminated fluid, a speed of flow of the contaminated fluid, or a level of contaminants in the contaminated fluid. In some embodiments, one or more sensors is positioned in a common influent well in fluid communication with the first and second fluid filtering chamber. In alternative embodiments one or more sensors are positioned in an effluent well. The system can further include a controller configured to initiate, stop, or adjust fluid flow to the first fluid filtering chamber and second fluid filtering chamber individually in response to the sensed condition. In some embodiments, the system can further include a common solids collection system in fluid communication with the first fluid filtering chamber and the second fluid filtering chamber.

Specific details of several embodiments of the technology are described below with reference to FIGS. 1A-3C. Other details describing well-known structures and systems often associated with fluid filtration systems have not been set forth in the following disclosure to avoid unnecessarily obscuring the description of the various embodiments of the technology. Many of the details, dimensions, angles, and other features shown in the Figures are merely illustrative of particular embodiments of the technology. Accordingly, other embodiments can have other details, dimensions, angles, and features without departing from the spirit or scope of the present technology. A person of ordinary skill in the art, therefore, will accordingly understand that the technology may have other embodiments with additional elements, or the technology may have other embodiments without several of the features shown and described below with reference to FIGS. 1A-3C.

Figure 1B:
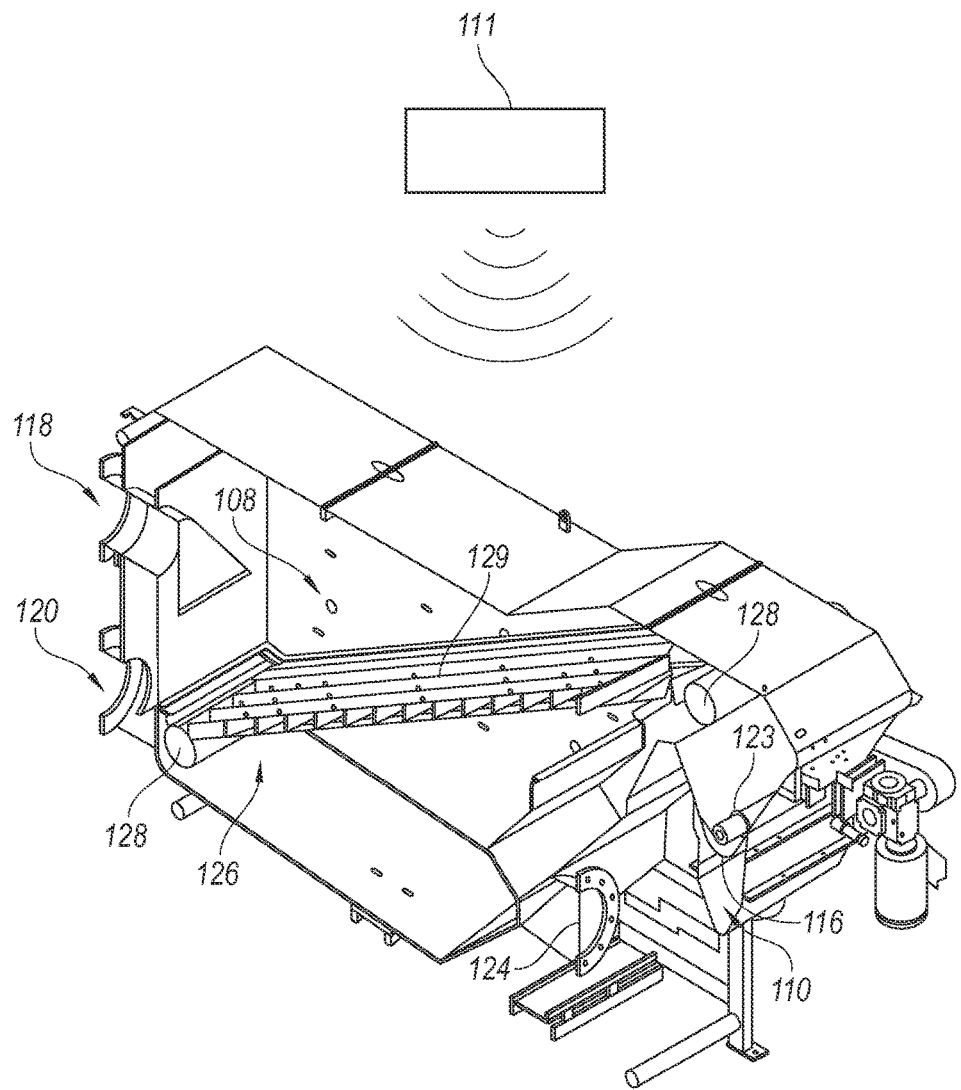
FIG. 1B is an isometric sectional view of the filtration system of FIG. 1A.

FIG. 1A is a front sectional view of a compartmentally expandable fluid filtration system 100 configured in accordance with embodiments of the technology. FIG. 1B is an isometric sectional view of the filtration system of FIG. 1A. Referring to FIGS. 1A and 1B together, the system 100 includes an enclosure 102 at least partially enclosing and defining a fluid channel compartment having at least one filter belt cartridge 126 positioned therein. Each cartridge 126 in the compartment can include a framework 129 extending between or connecting a plurality of rollers 128. The framework 129 and rollers 128 together provide a mounting structure for a filter belt 104. The filter belt 104 can pass over (e.g., rotate around) the rollers 128. In some embodiments, the rollers 128 can hold and maintain the filter belt 104 at a perpendicular or diagonal incline from horizontal. In particular embodiments, the filter belt 104 can be an integrated endless or looped filtering belt, such as a mesh belt, for removing or reducing the level of suspended solids in the fluid. In several embodiments, the cartridge 126 is removable from the compartment for maintenance, replacement, or operational reduction/expandability.

As will be described in further detail below, the system 100 can be expandable to include any number of cartridges 126 and/or compartments capable of parallel operation and shared functionality. For example, in various embodiments, each compartment can include one or more than one cartridge 126, and the filtration system 100 can be expandable to include any number of compartments. In some embodiments, the filtration system 100 can increase or decrease the number of cartridges 126 or compartments operating in parallel depending on system volume. For example, in various embodiments, the filtration system 100 can increase or reduce the number of cartridges 126 or compartments in operation by providing or restricting influent access to a fluid pathway of a compartment, by physically adding or removing cartridges 126 or compartments, or by initiating or halting filter belt operation in a given compartment.

Each compartment can have several generally similar features to enable ready expandability and shared functionality. For example, the enclosure 102 can include an inlet 118 to the fluid pathway and an overflow channel 120. In particular embodiments, the inlet 118 includes an influent well in communication with the fluid channel. In some embodiments, the inlet 118 and/or influent well can be shared by multiple compartments and/or can be capable of isolated operation (i.e., to provide fluid communication to an individual compartment or cartridge 126). In particular embodiments, the inlet 118 can include one or more adjustable weirs to split (e.g., equally split) the flow from the influent well between active compartments in operation. In some embodiments, the overflow channel 120 comprises a linearly-halved pipe, open on top, that runs perpendicular to the fluid flow at a selected overflow height of the fluid channel. In some embodiments, the filtration system 100 can include an effluent weir 112 that can allow for sharing of an effluent trough among compartments prior to fluid proceeding to an effluent pathway 124. A sludge cleanout 114 can likewise be shared between compartmental units.

The system 100 can further include one or more motors and/or gearboxes 106 that serve as conveyors to drive the filter belt 104 via drive shafts. As will be described in further detail below, in some embodiments, the motors and gearboxes 106 can be mounted and act perpendicular to the drive shafts and can be wholly supported on mounting brackets adjacent to the drive shafts. Motors can utilize belts or chains to transfer inertia and regulate the rotation of the drive shafts. In some embodiments, each cartridge 126 can be driven by a dedicated drive shaft, while in further embodiments a drive shaft can drive multiple cartridges 126 (within or across compartments) together. The system 100 can therefore operate cartridges 126 (e.g., filter belt rotation) independently or together, or can include a combination of some cartridges 126 operating together and others operating independently.

The system 100 can also include one or more sensors 108 to sense environmental and/or operational conditions in the system 100. For example, in some embodiments, the sensor 108 can sense one or more of fluid volume, flow rate, pressure, contaminant level or concentration, drive speed of the motors and gearboxes 106, or other condition. In some embodiments, the sensor 108 can be in communication with a controller 111 that can expand/reduce the size of the system 100. For example, the controller 111 can respond to the sensed condition by increasing or decreasing the number of compartments open to the influent well, and/or initiate, stop, or adjust fluid flow to or through the various compartments. In further embodiments, a plurality of sensors can be in communication with the controller 111 including one or more sensors in the influent well and/or in the effluent well. In further embodiments, the controller 111 can adjust belt operation or speed based on the sensed condition in either the influent or the effluent. The controller 111 can be an electronic controller or a mechanical controller (e.g., a weir or valve). The controller 111 can be integral to the system 100 (e.g., proximate to the sensor 108, inlet 118, or motors and gearboxes 106) or can be in remote communication with the system 100. In some embodiments, the sensor 108 can be mounted to the enclosure 102 and/or can be at least partially submerged in the influent well. Similarly, the sensor can be mounted to the enclosure and/or partially submerged in the effluent well (not shown for purposes of clarity). In particular embodiments, the sensor 108 can be flush and wall-mounted in the influent well and/or the effluent well. Such a sensor 108 in the influent well can regulate multiple cartridges 126 and/or compartments by mounting in a shared influent well.

The filtration system 100 can further include a solids collection system 122 in fluid communication with the fluid channel and configured to receive solids filtered by the filter belt 104. In various embodiments, the solids collection system 122 can be in fluid communication with an individual compartment or a plurality of compartments. The solids collection system 122 can include one or more augers 123 for capturing solids from fluid processed by the filter belt 104. In some embodiments, the solids collection system 122 can include a perforated, slotted, or otherwise porous plate 116 to allow integral dewatering in the conveyance portion of the auger 123. In some embodiments the perforated plate 116 comprises a generally parabolic shape, while in further embodiments the perforated plate 116 can be flat or have other shapes. An integral catch-basin 110 below the perforation plate 116 in the conveyance portion of the auger 123 can capture and/or redirect fluid drained from solids. Several features related to the integral solids collection system 122 will be described in further detail below with reference to FIGS. 2A-2C.

Figure 2A:
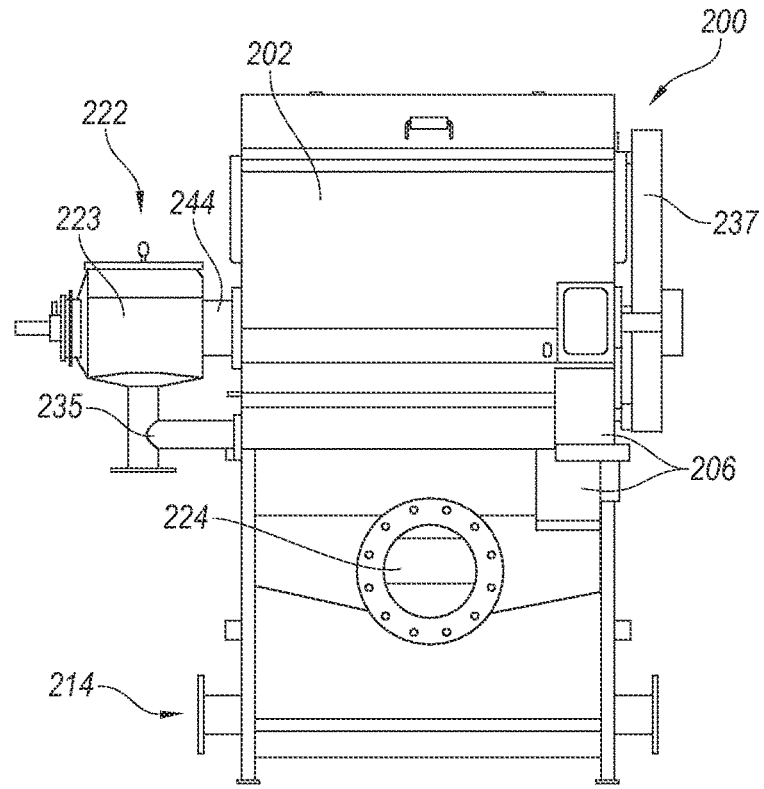
FIG. 2A is an end view a filtration system having energy reduction features and configured in accordance with embodiments of the technology.
Figure 2B:
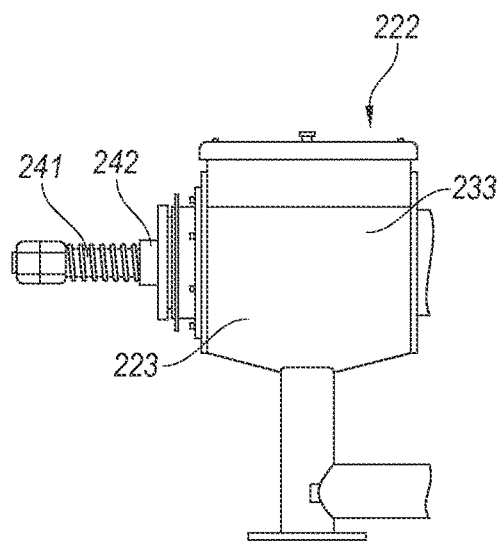
FIG. 2B is an end view of a portion of a solids collection system in the filtration system of FIG. 2A configured in accordance with embodiments of the technology.

FIG. 2A is a partially schematic end view a filtration system 200 having energy reduction features and configured in accordance with embodiments of the technology. FIG. 2B is an end view of a portion of a solids collection system 222 in the filtration system 200 and configured in accordance with embodiments of the technology. Referring to FIGS. 2A and 2B together, the system 200 includes several features generally similar to those described above with reference to FIGS. 1A and 1B. For example, the system 200 includes an enclosure 202 at least partially enclosing a compartment defining a fluid channel. Like the filtration system 100 described above, the filtration system 200 can be compartmentally expandable (e.g., by adding compartments on either side of the illustrated enclosure 202). The enclosure 202 includes an effluent pathway 224 for fluids exiting the system 200. A sludge cleanout 214, similar to the sludge cleanout 114 described above with reference to FIGS. 1A and 1B, can be shared with adjacent compartments. In further embodiments, the sludge cleanout 214 can be dedicated to a single compartment and can be positioned on an end wall of the enclosure 202 (rather than a sidewall) so as to not inhibit side-by-side compartmental expansion.

As described above with reference to FIGS. 1A and 1B, the system 200 can further include one or more motors and/or gearboxes 206 that serve as conveyors to drive a filter belt. In some embodiments, the motors and gearboxes 206 can be mounted adjacent and perpendicular to cartridge roller drive shafts and can reduce shaft wear and the footprint of compartmental expansion. In some embodiments, the motors and gearboxes 206 can include chains or belts 237 to transfer motive force in regulating shaft rotation.

The filtration system 200 can further include a solids collection system 222. Similar to the solids collection system 122 described above with reference to FIGS. 1A and 1B, the solids collection system 222 can include an auger 223. A low-amplitude linear tension spring 241 can provide for solids compaction by providing compression force against a compactor 242. In some embodiments, the compactor 242 comprises a back-pressure cone-shaped geometry, the narrow end of which can press into a compaction portion 233 of the auger 223. The tension spring 241 and compactor 242 can provide for unchanging angle of backpressure in the solids collection system 222. In some embodiments, the tension spring 241 can share the axis and plane of a dewatering auger shaft to eliminate the need for pneumatic energy.

The auger 223 can further include a conveyance portion 244 to convey fluid or waste across cartridges or compartments. Within the conveyance portion 244, a porous plate (such as the porous plate 116 shown in FIGS. 1A and 1B) can capture solids and allow drainage of fluid that can be directed to a drainage compactor 235. In some embodiments, the drainage compactor 235 is fluidly connected to multiple compartments.

Figure 2C:
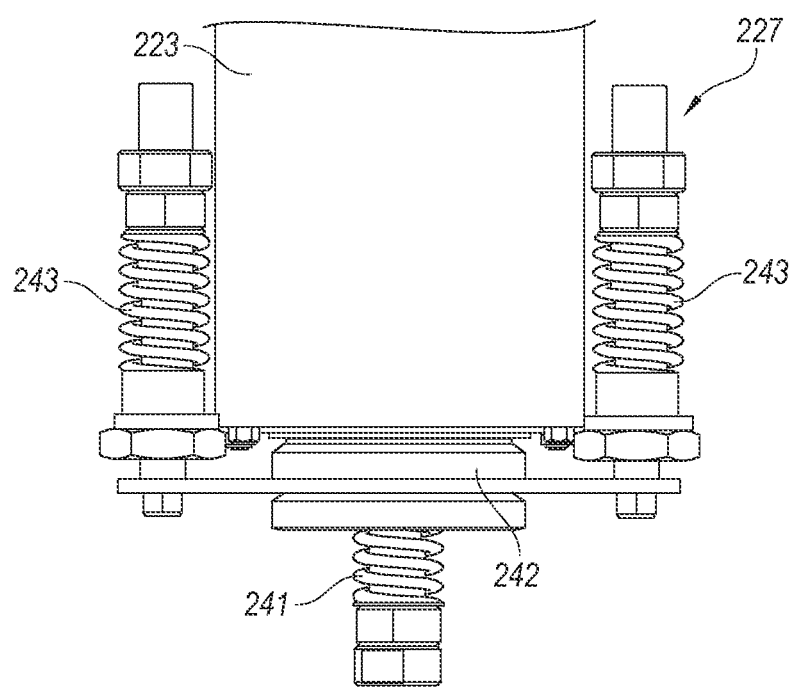
FIG. 2C is a top plan view of a portion of a solids collection system configured in accordance with further embodiments of the technology.

FIG. 2C is a top plan view of a portion of a solids collection system 227 having several features generally similar to the solids collection system 222 described above with reference to FIGS. 2A and 2B. The solids collection system 227 further includes a plurality of tension springs 243 coupled to the compactor 242 (e.g., coupled to the compactor at lateral sides of the auger 223) and configured to control compaction force of the compactor 242 with respect to the auger 223. In further embodiments, additional or fewer tension springs can be used in various configurations to provide compaction force or restorative force of the compactor 242 with respect to the auger 223. In some embodiments, the lateral positions of the springs 243 can provide improved alignment of the compactor 235 with the auger 223 and better dewatering.

Figure 3A:
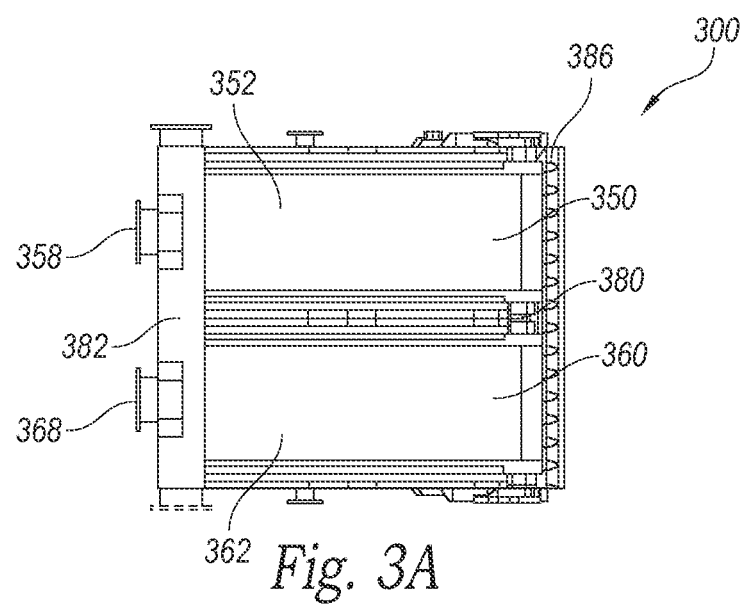
FIG. 3A is a top plan view of a fluid filtration system configured in accordance with embodiments of the technology.
Figure 3B:
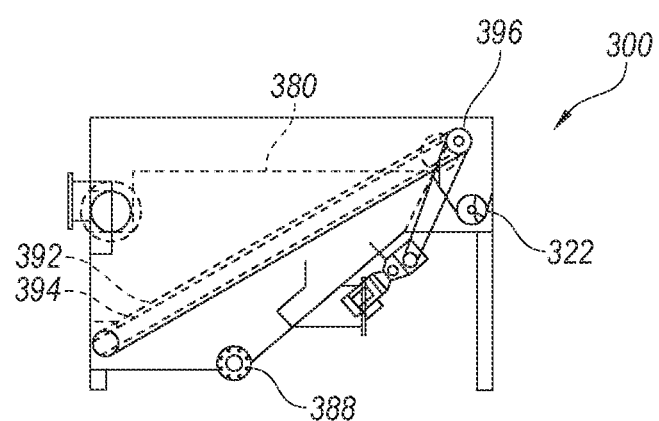
FIG. 3B is a front sectional view of the fluid filtration system of FIG. 3A.

FIG. 3A is a top plan view of a fluid filtration system 300 configured in accordance with embodiments of the technology. FIG. 3B is a front sectional view of the fluid filtration system 300. Referring to FIGS. 3A and 3B together, the fluid filtration system 300 includes several features generally similar to those described above with reference to the fluid filtration system 100 of FIGS. 1A and 1B and the fluid filtration system 200 of FIGS. 2A and 2B. The fluid filtration system 300 includes multiple cartridges operating in parallel in one or more fluid pathways. More specifically, the illustrated embodiment includes a first cartridge 350 in a first compartment 352 and a second cartridge 360 in a second compartment 362 generally adjacent to the first compartment 352. In some embodiments, the compartments 352, 362 can be at least partially separated by a partition 380 or sidewall. In further embodiments, there can be more or fewer compartments coupled to one another or positioned next to one another. Each of the first and second cartridges 350, 360 can include a filter belt 392, 394, respectively mounted on a roller framework as described above. The filter belts 392, 394 can be cleaned at a belt wash region 396.

Each compartment 352, 362 can include any of the features described above with reference to the fluid filtration systems 100, 200 described above. For example, each compartment 350, 360 can include an inlet 358, 368. The compartments 352, 362 can share a common overflow trough 382 and a common sludge conveyor 386 that communicates among cartridges 350, 360 and feeds to a sludge cleanout 388. The filtration system 300 can further include a solids collection system 322 that can communicate among cartridges in the manner described above with reference to FIGS. 2A and 2B. While certain features have been shown or described as being shared among cartridges or compartments or dedicated to an individual cartridge or compartment, in further embodiments any combination of these features can be shared or dedicated in any number of arrangements.

Figure 3C:
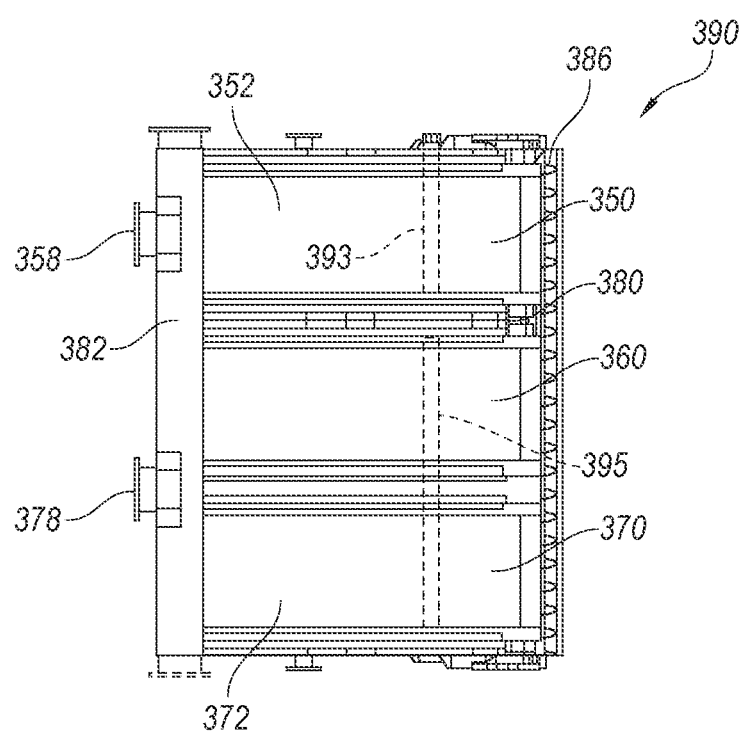
FIG. 3C is a top plan view of a fluid filtration system configured in accordance with further embodiments of the technology.

FIG. 3C is a top plan view of a fluid filtration system 390 configured in accordance with further embodiments of the technology. The fluid filtration system 390 is generally similar to the fluid filtration system 300 shown in FIGS. 3A and 3B. However, the system 390 includes the lone cartridge 350 operating in the first compartment 352 and a plurality of cartridges 360, 370 (two are shown) operating in a second compartment 372. In various embodiments, the system 390 can have any number of arrangements of cartridges and compartments. For example, there can be one or a plurality of cartridges in a given compartment and compartments within the system 390 can have the same or different numbers of cartridges therein.

The cartridges 360, 370 in the second compartment 372 can share a common fluid pathway fed by a shared inlet 378. In further embodiments, multiple compartments can share a common inlet. The first and second compartments 352, 372 share the common overflow trough 382 and the common sludge conveyor 386 described above with reference to FIGS. 3A and 3B.

In the illustrated embodiment, the cartridge 350 (e.g., the filter belt and rollers of the cartridge 350) in the first compartment 352 can be driven by a first drive shaft 393 while the cartridges 360, 370 in the second compartment 372 are driven by a shared second drive shaft 395 operable independent of an in parallel with the first drive shaft 393. In further embodiments, cartridges across compartments can operate on shared drive shafts. In still further embodiments, individual cartridges within a shared compartment can be driven by separate drive shafts.

The filtration systems described herein offer several advantages over traditional filtration systems. For example, the expandable compartmental design can provide a more efficient operation than fixed systems, as the compartments can be responsive to varying volumetric flow rates. In wastewater treatment this is exemplified in diurnal variation, and the maximum flow variation can be as much or more than two to ten times the average daily flow of the treatment system. The compartmental design can enhance treatment flexibility for varying flow rates. During periods of higher flow, more compartments can be opened, thereby engaging more filtering belt cartridges for cleaning water. During periods of lower flow, compartments can be isolated, allowing idle filter belt cartridges to be switched off Traditional filtration systems require 100% duplication of equipment subunits planned to operate for the maximum flow. The expandable design of the filtrations systems described herein include significant material reduction with shared walls, channels, drives, and dewatering for captured solids. The filtration systems can handle peek flows more cost effectively than traditional systems and can save energy by isolating power from non-active modules below peak flow.

The present technology offers additional efficiency by providing shared functioning and components among compartments. For example, multiple compartments can share components such as a common influent well, shared solids handling systems, shared sludge cleanout systems, etc. Compartments can utilize internal fixed effluent weirs allowing sharing of an effluent trough throughout all compartments. This shared functionality is enabled in some embodiments by side-by-side compartment construction that connects shared components via sidewall conduits (e.g., connections through the partition) and positions other (non-shared) features on endwalls of the compartment. The present fluid filtration systems can thus provide improved throughput with a reduced footprint as compared to traditional systems. Aspects of the compartmental design of the technology can be fully integrated in a single cartridge of the water cleaning device or in any multiple of cartridges.

Multiple cartridges can be mounted in parallel compartmental assemblies. The number of cartridges can be endless to accommodate maximum flows. Water can be isolated from any one compartment to match the required filtration capacity to a varying flow. This compartmental design also provides redundancy of operation at a cost reduction and can facilitate system maintenance without reducing the quality of water cleaning.

The sensor/control systems described herein offer additional advantages over traditional systems. As pressure sensors used for traditional systems are suspended in the influent water, they fail with buildup of solids and bacteria. Thus, existing technology requires 100% duplication of ancillary equipment for all subunits and multiplies the potential for water cleaning failure by requiring a suspended sensor for each cleaning device cartridge. The systems described herein can solve the problem of bacterial and particle buildup and unnecessary equipment duplication by integrating a flush wall-mounted pressure sensor that can be mounted in a shared influent channel.

The present technology offers further improvements to motor and gear systems as compared to traditional systems. Water cleaning devices may use shaft mounted gear drives and motors, the weight of which puts added stress on the shafts which leads to excessive wear and shorter part life. Shaft-mounted gear boxes and motors also require significant distance separating cleaning devices mounted in parallel. The technology described herein solves these problems by utilizing motors and gears boxes mounted and acting perpendicularly to the drive shafts and wholly supported on mounting brackets adjacent to the shafts. Motors can utilize belts or chains to transfer inertia and regulate the rotation of the drive shafts. Motors may no longer require as much space between cleaning device cartridges, thereby reducing equipment footprint.

Additionally, existing water cleaning technology may include an impermeable sleeved auger bin, sealing the bin from any drainage in the conveyance section of the auger. This can often lead to bottle-neck and failure in the compaction section of the auger. The present technology reduces energy usage by utilizing a dewatering auger designed to have a perforated, slotted, or otherwise porous bottom to allow dewatering in the conveyance portion of the auger prior to the compaction section of the auger. An integral catch-basin below the perforations in the conveyance section can direct water drained from solids to the drainage of the compaction section of the dewatering auger.

The solids collection systems described herein offer still further advantages over traditional systems. In the past, water cleaning devices have utilized a pneumatic back-pressure cone for constant-pressure dewatering, requiring energy from compressed air. Alternatively, hinged flat pressure plates held by springs were used, but the amplitude and varying angle of the springs prohibited constant back-pressure; dewatering has therefore been inconsistent and with significant energy loss. As an improvement for energy reduction in the expandable compartmental design of the cleaning device, the technology described herein can integrate a low-amplitude linear spring tensioned back-pressure cone for unchanging angle in the solids dewatering and compaction unit. The linear spring can share the axis and plane of the dewatering auger to eliminate the need for pneumatic energy.

The order in which the above systems and methods are described is not intended to be construed as a limitation, and any number of the described features and steps can be combined in any order. Furthermore, the technology described herein can be implemented in any suitable hardware, software, firmware, or combination thereof such that a computing device can implement the technology. In one case, a method is stored on a computer-readable storage media, such as RAM, hard drive, optical disc, etc., as a set of instructions such that execution by a computing device, causes the computing device to perform the method.

From the foregoing, it will be appreciated that specific embodiments of the technology have been described herein for purposes of illustration, but that various modifications may be made without deviating from the disclosure. For example, while various attributes of the fluid flow or the filtering apparatus are designated as "upper", "lower", "left", "right", "upwardly-facing", "downward", etc., these terms are used only for purposes of explaining the accompanying drawings. For example, in some embodiments, an inlet may be at a lower height than an outlet and/or fluids may be filtered upwards through a filter mesh such that gravity assists in keeping contaminants from piercing an overhead filter. In still further embodiments, the filtration systems may include additional features, such as overflow chambers, fluid routing systems, or additional flow paths. Additionally, while advantages associated with certain embodiments of the new technology have been described in the context of those embodiments, other embodiments may also exhibit such advantages, and not all embodiments need necessarily exhibit such advantages to fall within the scope of the technology. Accordingly, the disclosure and associated technology can encompass other embodiments not expressly shown or described herein. Thus, the disclosure is not limited except as by the appended claims.

We claim:

1. A filtering system, comprising:
    a first fluid filtering chamber, the first fluid filtering chamber having a first inlet in communication with a first fluid pathway;
    a first filter belt positioned around a first set of rollers in the first fluid pathway;
    a second fluid filtering chamber, the second fluid filtering chamber having a second inlet in communication with a second fluid pathway, wherein the second fluid filtering chamber has a shared sidewall with the first fluid filtering chamber; and
    a second filter belt positioned around a second set of rollers in the second fluid pathway, wherein the first filter belt is movable independent of the second filter belt.

2. The filtering system of claim 1 wherein the first filter belt and the second filter belt are positioned at a generally perpendicular or diagonal incline from horizontal.

3. The filtering system of claim 1, further comprising an influent well in fluid communication with the first fluid filtering chamber and the second fluid filtering chamber, wherein the influent well includes at least one adjustable weir to adjust fluid flow to the first and second fluid filtering chambers.

4. The filtering system of claim 1, further comprising a controller configured to control at least one of flow of fluid in the first and second fluid pathways or speed of operation of the first filter belt and the second filter belt.

5. The filtering system of claim 4, further comprising one or more sensors configured to sense at least one condition related to a volume of flow or a level of contaminants in a fluid, wherein the controller is responsive to the sensed condition.

6. The filtering system of claim 5 wherein the sensor is positioned in an influent well in fluid communication with the first fluid filtering chamber and the second fluid filtering chamber.

7. The filtering system of claim 1, further comprising a solids collection system in fluid communication with the first fluid filtering chamber and the second fluid filtering chamber and configured to receive solids filtered by at least one of the first filter belt and second filter belt.

8. The filtering system of claim 7 wherein the solids collection system comprises a dewatering auger having a perforated or slotted filter plate configured to drain fluid from the solids.

9. The filtering system of claim 7 wherein the solids collection system comprises a spring-tensioned back-pressure cone configured to provide generally constant dewatering back-pressure to the solids collection system.

10. The filtering system of claim 1 wherein the first and second set of rollers are rotated by at least one drive shaft, and wherein the filtering system further comprises a motor and gear system mounted perpendicular to the drive shaft.

11. A method of filtering fluid, the method comprising:
    inletting contaminated fluid into a filtering system;
    sensing at least one of a volume of the contaminated fluid or a level of contaminants in the contaminated fluid; and
    in response to the sensing, inletting the contaminated fluid into at least one of a plurality of fluid filtering channels operating in parallel, wherein individual fluid filtering channels are separated by a shared partition wall, and wherein each individual fluid filtering channel includes a filter belt therein.

12. The method of claim 11, further comprising isolating fluid flow from an individual fluid filtering channel in response to the sensing.

13. The method of claim 11 wherein inletting the contaminated fluid into at least one of the plurality of fluid filtering channels comprises inletting the contaminated fluid from a common influent well.

14. The method of claim 13, further comprising equalizing a volume of fluid flow of the contaminated fluid to a plurality of the individual fluid filtering channels through the use of adjustable weirs positioned in the influent well.

15. The method of claim 11, further comprising filtering solids from the contaminated fluid, wherein the solids are passed to a solids handling system in fluid communication with the plurality of fluid filtering channels.

16. The method of claim 15, further comprising passing the solids to a dewatering auger having a perforated or slotted filter plate, and draining fluid from the solids via the filter plate.

17. A filtering system for filtering contaminated fluid, the system comprising:
- a first fluid filtering chamber having a first filter belt movably positioned therein;
- a second fluid filtering chamber having a second filter belt movably positioned therein, wherein the first filter belt is operable in parallel with the second filter belt;
- at least one sensor configured to sense a condition related a volume of the contaminated fluid, a speed of flow of the contaminated fluid, or a level of contaminants in the contaminated fluid; and
- a controller configured to initiate, stop, or adjust fluid flow to the first fluid filtering chamber and second fluid filtering chamber individually in response to the sensed condition.

18. The filtering system of claim 17, further comprising a common influent well in fluid communication with the first fluid filtering chamber and the second fluid filtering chamber, wherein the sensor is positioned in the common influent well.

19. The filtering system of claim 17, further comprising a common solids handling system in fluid communication with the first fluid filtering chamber and the second fluid filtering chamber.

20. The filtering system of claim 17 wherein the first fluid filtering chamber is separated from the second fluid filtering chamber by a shared partition.

* * * * *